Nov. 16, 1965    T. ACOSTA ETAL    3,217,763
FRUIT HANDLING MECHANISM FOR JUICING MACHINE
Filed Dec. 31, 1962    4 Sheets-Sheet 2

INVENTORS
TRACY ACOSTA
ARTHUR C. CORDRAY
BY
ATTORNEYS

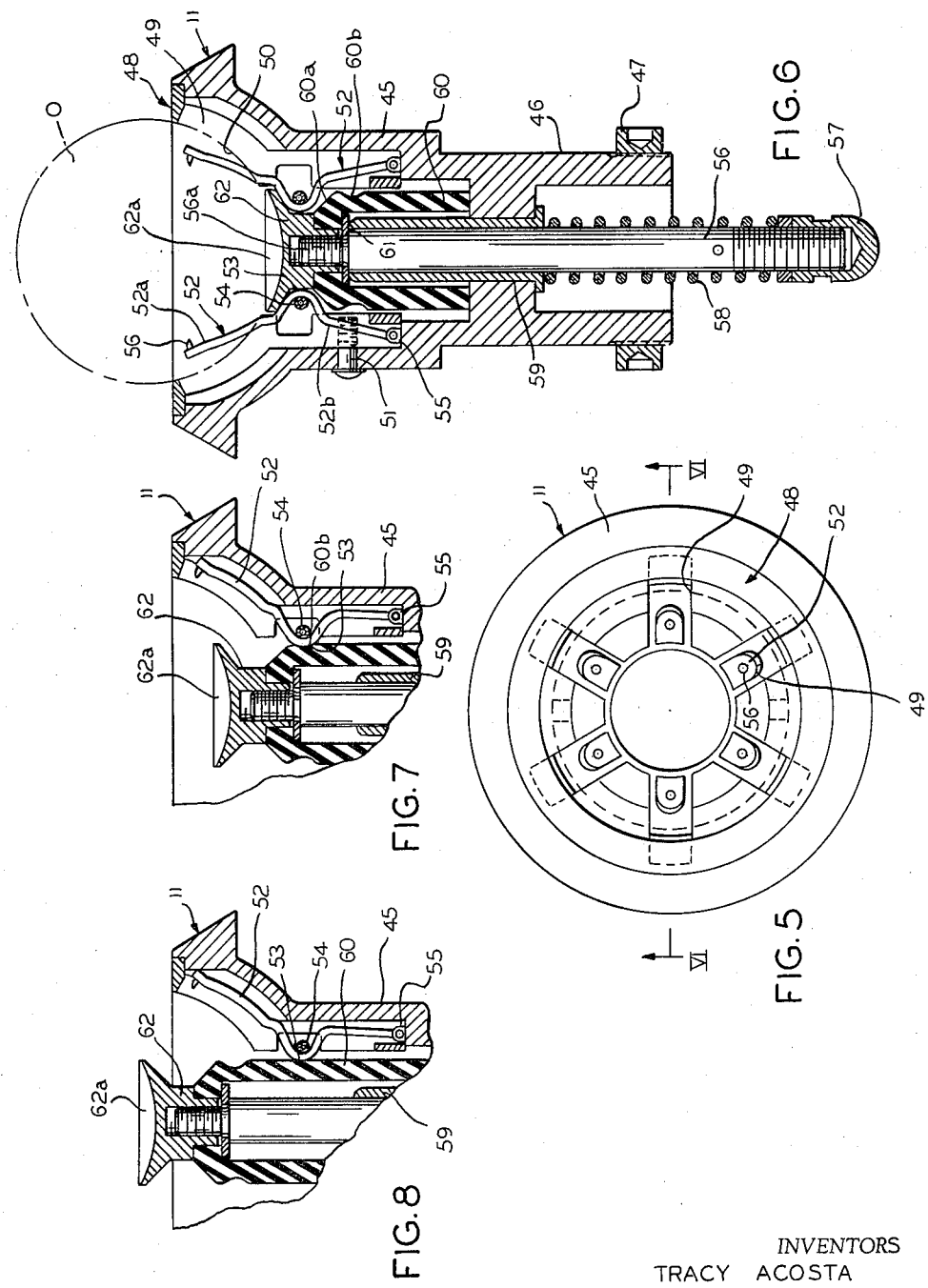

United States Patent Office 3,217,763
Patented Nov. 16, 1965

3,217,763
FRUIT HANDLING MECHANISM FOR
JUICING MACHINE
Tracy Acosta, 2700 S. Wood St., Chicago, Ill., and Arthur
C. Cordray, 841 Montford Road, Cleveland Heights,
Ohio
Filed Dec. 31, 1962, Ser. No. 248,575
5 Claims. (Cl. 146—3)

The present invention relates to improvements in automatic fruit juicing machines and more specifically to improvements in a device for holding the fruit while it is being cut and while the juice is being extracted and later expelling the extracted rind.

While the arrangements of the present invention provide advantages in various environments, they are particularly advantageous and relate to a fruit juicing machine such as the type shown in Patent No. 2,365,832 Monroe, and the invention provides improvements to the type of fruit supporting mechanism shown in U.S. Patent 2,753,903 Allison.

Automatic machines of this general type are used for extracting the juice from a fruit such as oranges or other citrus fruit. These machines may be employed for mechanically removing the juice from the fruit, and they may be used to dispense individual drinks to the public. Operation of the machine may be initiated by a coin operated starting switch whereupon the machine will automatically extract the juice from the fruit and deliver to the customer a measured quantity of fresh juice. It is critical that the machine be constructed so as to be reliable in operation and not drop the fruit during handling, for practical operation of the machine, for sanitation, and for appeal to the consuming public.

In general, a feature of the present invention is the provision of fruit receiving and gripping hands which will receive a fruit such as an orange fed from an overhead hopper. The hand securely holds the fruit in position and carries it to a second hand which engages the fruit at a diametrically opposite position while a knife severs the fruit. The hands then carry the individual half fruits down to an extractor member which may be in the form of a rotating reamer to remove the juice from the interior of each of the hands. The juice is delivered to a collecting container or cup which is subsequently delivered to the consumer. The hands then discard the extracted fruit rind and move up to receive a fresh unextracted fruit and again repeat their cycle.

Accordingly an object of the present invention is to provide an improvement in fruit handling mechanisms which will positively and securely grip an individual fruit and carry it through a series of positions or stations without dropping or damaging the fruit and giving full cooperation to the performance of the cutting and extracting members.

A further object of the invention is to provide an improved fruit handling hand which is better capable of handling spherically shaped fruit and which will not accidentally drop the fruit if the size varies, or if any shape of fruit is received, or if a portion of the fruit is soft.

A more specific object of the invention is to provide an improved fruit handling hand having gripping fingers therein which provide improved operation in structure over fingers heretofore available.

Another object of the invention is to provide fruit supporting and gripping hands which are movable through a series of positions wherein the movement of the hands is more smooth avoiding the possibility of sudden jerks or movements which were heretofore encountered and which created the possibility of dropping the fruit.

A still further object of the invention is to provide an improved support and drive mechanism for fruit handling hands which has reduced wear and is therefore capable of a longer operating life.

Other objects, advantages and features will become more apparent with the teaching of the principles of the present invention in connection with the disclosure of the preferred embodiment thereof, in the specification, claims and drawings, in which:

FIGURE 5 is a top plan view of one of the fruit receiving hands showing the interior of the cup;

FIGURE 6 is a sectional view taken substantially along line VI—VI of FIGURE 5;

FIGURE 7 is a fragmentary sectional view similar to FIGURE 6 and showing the position of the parts when they are locked in fruit-receiving position; and FIGURE 8 is a fragmentary sectional view similar to FIGURE 7 showing the parts in fruit rind ejecting position.

On the drawings:

Figure 1:
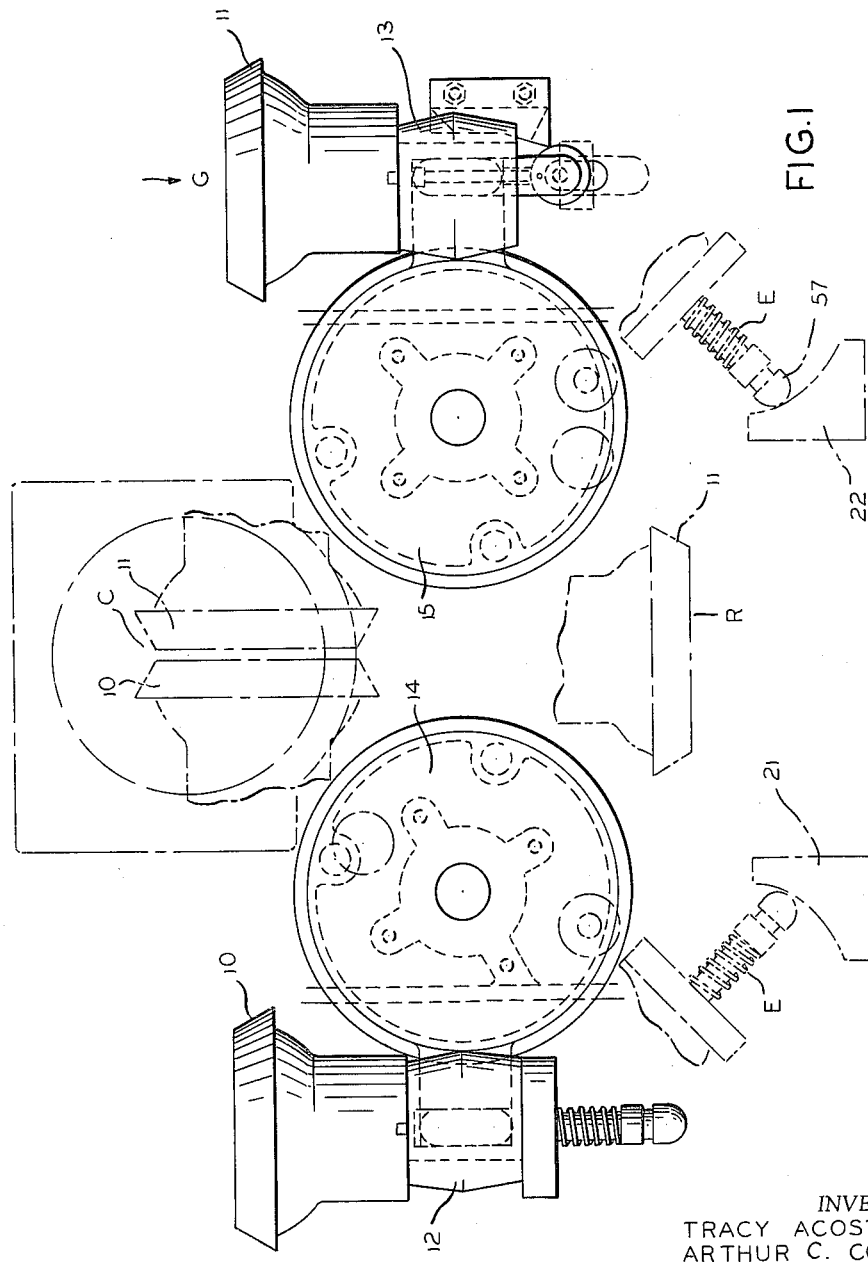
FIGURE 1 is a front elevational view showing in somewhat schematic form of a pair of fruit handling hands constructed and operating in accordance with the principles of the present invention.
Figure 2:
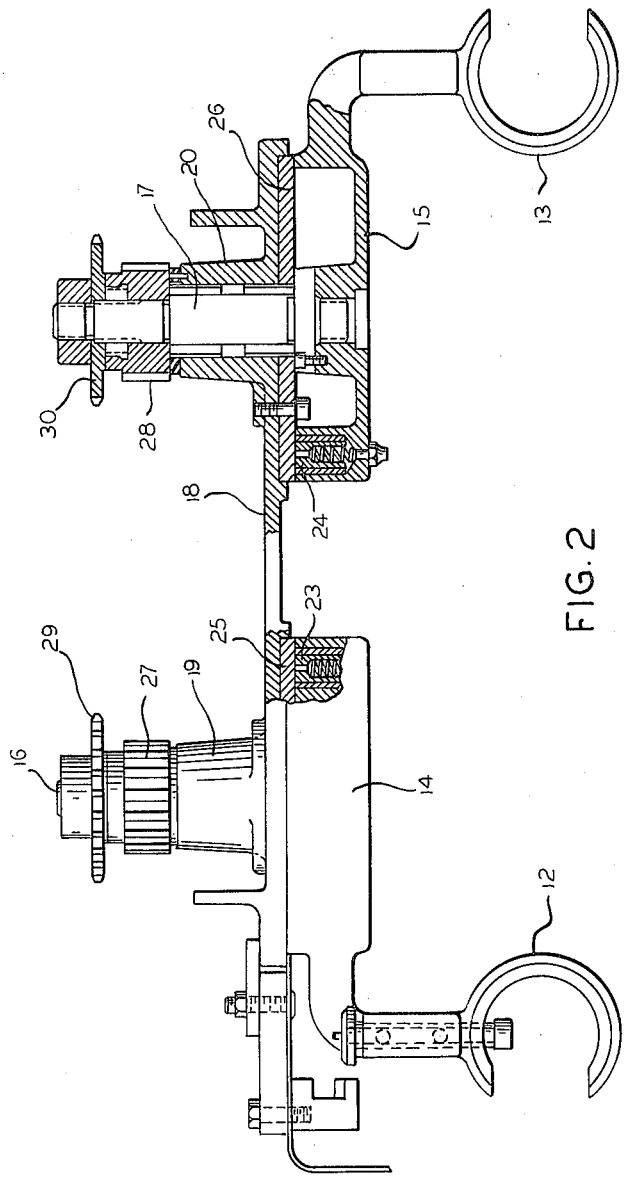
FIGURE 2 is a top plan view with portions broken away and portions omitted for clarity, of the mechanism for supporting the hands with the hands omitted.

FIGURES 1 and 2 illustrate left and right hand fruit supporting hands 10 and 11 mounted in C-shaped holders 12 and 13. The holders are carried on pivotally mounted drums or plates 14 and 15 which are supported on shafts 16 and 17.

The assembly is supported on a stationary plate 18 which forms part of the housing of a fruit juicing machine. The plate 18 is provided with hubs or bosses 19 and 20 having suitable bearings for pivotally supporting the shafts 16 and 17.

As illustrated in FIGURE 1, the fruit handling hands 10 and 11 are moved through a series of positions to accomplish their function. A fruit is first delivered to the hands when they are in the solid line position, and a single fruit as an orange is dropped downwardly into the hand 11, as indicated by the arrow about the hand. Mechanism for storing and releasing the fruit, and for accomplishing the other ancillary functions such as cutting the fruit, reaming the juice therefrom, receiving the rinds and other operations are performed by mechanisms such as that shown in the above mentioned Patent 2,365,-832 Monroe.

Upon receiving the fruit at position G, FIGURE 1, the right hand hand 11, and the left hand hand 10 move together to the dotted line cutting position C. At that point a power operated knife moves between the hands to slice the fruit in half, and the knife may be of various structural arrangements as will be appreciated by those skilled in the art. When the fruit is cut in half, one of the hands such as the hand 10 moves to the left, and the hand 11 moves downwardly to the reaming position R. A reamer moves up into the fruit to extract the juice. The hand 11 then rotates clockwise to the rind ejection position E and a plunger end 57 strikes an ejection cam 22 to eject the rind as will later become more clear. The left hand hand 10 then moves down into the reaming position R and the reamer extracts the juice, and the hand is thereafter rotated counterclockwise to the ejection position E to engage an ejection cam 21.

In the movements of the hands sudden shocks or jerking movements will tend to wrest the fruit from the hand and it may be dropped. A feature of the present invention is the provision of counterweight mechanism which aids in insuring smooth movement of the hands.

The counterweight mechanism applies a moment arm or a torque to the shafts supporting the hands in a direction to aid the movement of the hands for their major portion of movement when they are carrying fruit and facing either laterally or downwardly. The counterweight force also balances the weight of the hand on the shaft, and inasmuch as the hand is mounted eccentric with respect to the shaft the shaft will have a moment applied thereto due to the weight of the hand.

A torque or moment arm is applied to the shafts supporting the hand in a direction tending to move the hands apart when they are in the cutting position C.

The hands are driven through their positions by pinion gears 27 and 28 on the shafts 16 and 17. Suitable drive gears mesh with the pinions, and the drive gears may be segment gears driven by cams such as shown for example in the above mentioned Monroe Patent 2,365,832.

Figure 3:
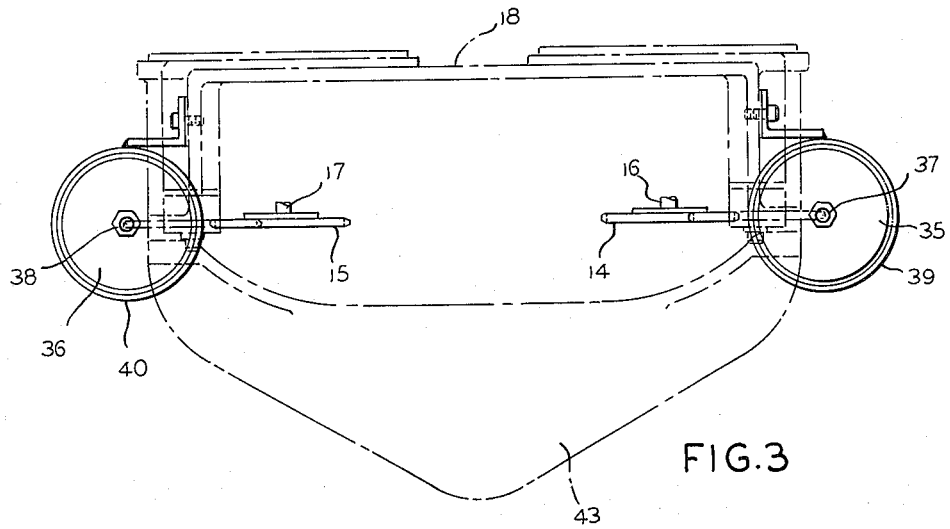
FIGURE 3 is a top plan view of counterweight mechanism for the hands with portions omitted.
Figure 4:
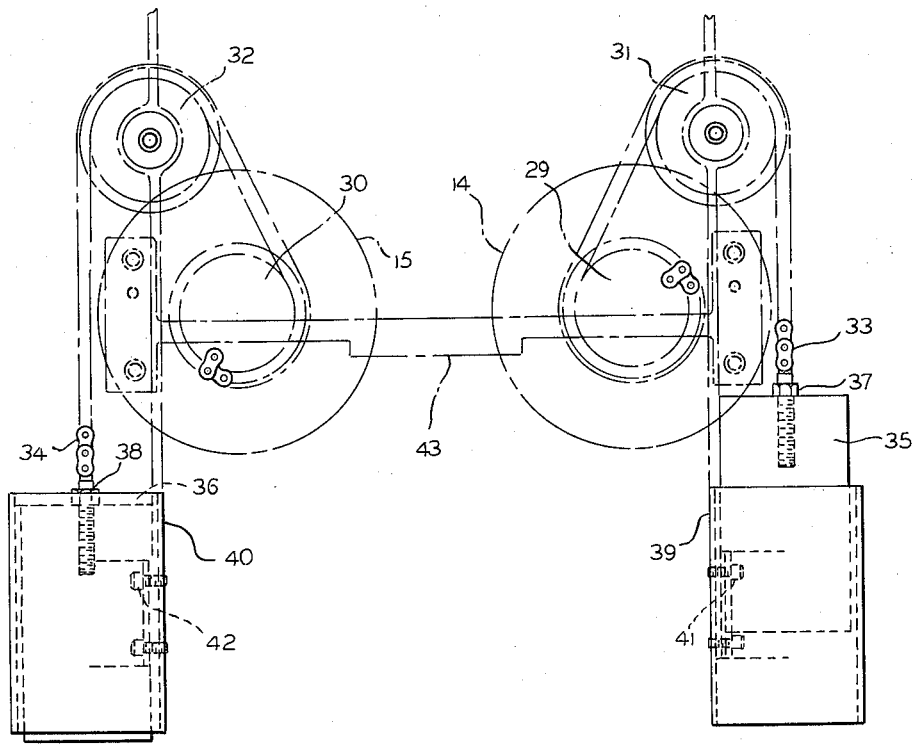
FIGURE 4 is a rear elevational view of the mechanism of FIGURE 3 illustrating the counterweights and having portion omitted for clarity.

The counterbalancing force is applied to the shafts 16 and 17 by sprockets 29 and 30 secured to the shafts and wrapped by chains 33 and 34, FIGURES 3 and 4. The ends of the chains are secured to the sprockets.

Above the shaft sprockets 29 and 30 are guide idler sprockets 31 and 32 which lead the chains upwardly and slightly outwardly. The chains are threaded over the idler sprockets 31 and 32 and depend downwardly with counterweights 35 and 36 attached to the ends of the chain by attachment members 37 and 38. The attachment members may be of any suitable type, and are illustrated as being threaded into the tops of the counterweights, and the counterweights may be of cast metal with tapped openings from the top.

Thus the counterweights apply a constant torque to the shafts 16 and 17 counterbalancing the weight of the hands when they are between the shafts. The counterbalancing weights are preferably heavier than the weight of the hands with the fruit so that the pinions 27 and 28 will always tend to turn with respect to their drive gears. Thus when the hands pass over the top of the shafts so that the center of gravity of the hand assembly shifts from one lateral side of the shaft to the other there is no sudden jerk as might occur if play exists in the gear teeth. Also, the gear teeth will always be in constant contact so that there will be no sudden impact engagement with reversal of the drive gear. This avoids jerks and also avoids wear.

The counterbalancing chains are arranged to provide an upward force to the shafts 16 and 17 thereby reducing the total load on the bearings supporting the shafts and counteracting the vertical forces due to the weight of the hands.

To additionally stabilize and support the hands in the reaming position, the plates 14 and 15 are provided with locking plungers 23 and 24 which project into mating recesses in plates 25 and 26 on the frame. These recesses are not shown and are positioned to be engaged by the plungers 23 and 24 when the hands are in reaming position. The plungers will be moved out of the openings by a suitable mechanism at the end of the reaming operation so that the hands may be carried to the ejection position.

The counterweights 35 and 36 depend downwardly into tubular shields 39 and 40. These shields are stationarily mounted such as by bolts 41 and 42 on the frame, and provide a guide for the counterweights as they move vertically up and down preventing any lateral swinging movement thereof. The frame for the machine includes a yoke 43 extending across as illustrated in FIGURES 3 and 4.

The hands are shown in greater detail in FIGURES 5 through 8. Since the hands are of substantially identical construction only one need be shown in detail. The hand 11 includes an outer housing or shell 45 with a cylindrically shaped lower end 46 for fitting into the C-shaped holder 13. A locking ring 47 is threaded upwardly onto the bottom of the shell 46 to secure the shell into the holder.

The upper end of the shell 46 is concave and cup shaped, and receives an inner shell 48 which has an upwardly facing concave opening. The inner shell has a plurality of circumferentially spaced radial slots 49. The inner surface 50 of the shell between the slots is concave and substantially of a shape to conform with a spherical piece of fruit O. The inner shell 48 is held within the outer shell by a radially extending bolt 51.

Positioned within the inner shell and movable radially within the radial slots 49 are a plurality of general axially extending rigid fingers 52.

The fingers 52 are rigid or stiff and are non-bending for positive gripping of the fruit and it has been found that this achieves a more reliable hold on the fruit and a more reliable movement of the fingers.

The fingers 52 have an upper portion 52a and a lower portion 52b, with the lower portion being provided with pivotal supports 55 at the base of the inner shell 48. Intermediate the ends the fingers are bent inwardly to provide a shoulder 53 and the shoulder provides an outwardly facing notch in which seats an annular garter spring 54 that urges the fingers inwardly toward gripping position. The fingers are shown at their radial innermost position which they assume when there is no fruit in the hand, and if a fruit such as O is present the fingers will engage the outer surface thereof, and teeth 56 at the outer end of the fingers will be forced into the skin of the fruit to improve the hold thereon.

Extending axially through the center of the hand is a fruit ejection and finger operating plunger 56. A rounded cam engaging nut 57 is threaded onto the lower end of the plunger 56, and a spring 58 is held on the plunger by a nut. The upper end of the spring 58 engages a bearing sleeve 59 supported in the shell 46.

The upper end of the plunger 56 is threaded at 56a and a fruit ejector head 62 is threaded onto the upper end of the plunger. The head has a rigid one piece concave upwardly facing fruit engaging ejector surface 62a in which the fruit rests when the plunger is in its retracted position, as shown in FIGURE 6, and which pushes the fruit out of the hand when the plunger is extended, as shown in FIGURE 8.

The plunger carries a finger operating head 60 at its upper end and the head has an annular cam surface 60a at its upper end which pushes the fingers apart to release the fruit when the plunger is moved upwardly. Beneath the cam surface is a locking groove 60b in which the shoulders 53 of the fingers seat at an intermediate fruit receiving position of the plunger, as shown in FIGURE 7. This position is also a fruit ejecting position for the finger. The locking groove 60b is defined between downwardly and upwardly facing surfaces on the upper and lower sides of the groove 60b.

The plunger is in its fruit receiving position when the hand 11 is in the fruit receiving position shown in FIGURE 1. As the fruit is dropped on the rigid surface 62a, the plunger is forced downwardly and the rigid fingers 52 snap against the sides of the fruit.

For the hand 10, its plunger is in the intermediate position when the hands 10 and 11 are brought together in the cutting position C, and as the fruit is carried by the hand 11 into the hand 10, the plunger is depressed so that the fingers of the hand 10 snap against the side of the fruit.

When the fruit is to be ejected, and the plungers engage the cams 21 and 22, as shown in FIGURE 1, the plunger is pushed to the extreme ejection position as shown in FIGURE 8 which separates the fingers 52 from their maximum amount.

The fingers are constructed with the lower portion 52b extending substantially axially down beneath the fingers for a substantial distance. This increases the effective action of the annular spring 54 and improves the action of the cam surface 60a of the plunger for improved gripping and improved release of the fruit. The lower portion 52b of the fingers must be of a substantial length, and preferably the length of the finger which is exposed within the cup surface 50 is shorter than the remainder of the finger which extends downwardly from the base of the inner shell or cup 48.

In operation, a fruit is dropped into the cup 11 in position G in FIGURE 1, and carried over to the cutting position C into the cup 10. The fruit is cut and each half is thereafter moved down to the reaming position R, and the juice extracted rind is thereafter ejected with the hand being moved to position E. During this movement the operations of the cup are smoothed and the backlash is taken out of the gears by counterweights 35 and 36, FIGURES 3 and 4, which apply constant moment arm or torque to the cup supporting shafts 16 and 17. The fruit is gripped within the hand by rigid elongated fingers 52, which are released against the fruit by the plunger being moved to a downward position, as shown in FIGURE 6. When the fruit is ejected the plunger is moved upwardly to an ejection position, as shown in FIGURE 8, and the concave outer surface 62a of the head 62 supports the fruit while it is in the hand, and ejects it when it is to be released from the hand.

Thus it will be seen that we have provided an improvement in cup and arm mechanisms for automatic fruit juicing machines, which meet the objectives and advantages above set forth.

The mechanism is capable of more reliable operation than devices heretofore available and will securely and reliably grip and carry a fruit member through the positions required for the juice extracting functions. Reliable operation is accomplished through smooth movements and the elimination of sudden accelerations and decelerations, and through the improved gripping of the fruit.

The drawings and specification present a detailed disclosure of the preferred embodiments of the invention, and it is to be understood that the invention is not limited to the specific forms disclosed, but covers all modifications, changes and alternative constructions and methods falling within the scope of the principles taught by the invention.

We claim as our invention:

1. A fruit handling mechanism for a fruit juicer comprising,
   a fruit carrying hand capable of gripping a fruit,
   a pivotally supported substantially horizontal shaft means having said hand eccentrically secured thereto,
   means for pivotally driving said shaft means moving the hand between a fruit receiving position, a juice extracting position and a fruit rind ejecting position,
   cable means wrapped around said shaft means, and a counterweight suspended on said cable means for applying a torque thereto counterbalancing the weight of the hand of the shaft means.

2. A fruit handling mechanism for a fruit juicer comprising,
   a fruit carrying hand capable of gripping a fruit,
   a pivotally supported substantially horizontal shaft means having said hand eccentically secured thereto,
   means for pivotally driving said shaft means moving the hand between a fruit receiving position, a fruit juice extracting position and a fruit rind ejecting position,
   cable means wrapped around said shaft means,
   a guide member positioned above the shaft means and carrying the cable means for applying an upwardly directed torque force to the shaft,
   and a weight suspended on the cable means so that a force is applied to the cable means.

3. A fruit handling mechanism for a fruit juicer comprising,
   a fruit carrying hand capable of gripping a fruit,
   a pivotally supported substantially horizontal shaft means having said hand eccentrically secured thereto,
   means for pivotally driving said shaft means moving the hand between a fruit receiving position, a juice extracting position and a fruit rind ejecting position,
   cable means wrapped around said shaft means, a counterweight suspended on said cable means for applying a torque thereto counterbalancing the weight of the hand of the shaft means,
   and a fixed tubular shield telescopically receiving said counterweight and extending downwardly so that the counterweight will reciprocate vertically therein with movement of the hand and will be laterally restrained within said shield.

4. A fruit handling mechanism for a fruit juicer comprising,
   an axially elongated fruit receiving hand having a concave upper end,
   an inner cup rigidly mounted within the hand having an upwardly facing concave fruit receiving opening and having radially inwardly facing slots,
   rigid elongated axially extending fingers positioned in said slots and pivoted on the cup at their lower ends,
      said fingers having concave upper ends for receiving a fruit,
      said fingers having an inwardly projecting shoulder intermediate their ends,
   an elongated ejector plunger slidably mounted within said hand for axial movement therein,
   an annular cam surface on said plunger for engaging the shoulders of said fingers to spread them apart to fruit releasing position, an annular garter spring surrounding said fingers opposite the shoulders thereof for urging the fingers inwardly,
   an annular recess in the plunger below said cam surface for receiving said shoulders and locking the plunger in a fixed axial position,
   spring means between the plunger and hand for urging the plunger to recessed fruit gripping position wherein the fingers are permitted to move inwardly to grip the fruit,
   a rigid fruit ejecting end member on the plunger having a concave upwardly facing rigid surface for engaging the fruit and pushing it out of a hand when the plunger is moved axially upwardly,
   a pivotally supported substantially horizontal shaft means supporting said hand eccentrically with respect to the axis of the shaft means,
   a sprocket secured to said shaft means,
   a chain wrapped over said sprocket,
   a guide sprocket above the shaft means for leading said chain upwardly,
   a counterweight attached to the free end of the chain and depending downwardly for counterbalancing the weight of the hand,
   a shield surrounding said counterweight and extending downwardly for preventing lateral movement of the counterweight,
   and means for pivotally driving said shaft means moving the hand between a fruit receiving position, a juice extracting position and a fruit rind ejecting position.

5. A fruit handling mechanism for a fruit juicer comprising,
   a fruit carrying hand capable of gripping a fruit,
   a pivotally supported substantially horizontal shaft means having said hand eccentrically secured thereto,
   means for pivotally driving said shaft means moving the hand between a fruit receiving position, a juice extracting position and a fruit rind ejecting position,
   a sprocket secured to said shaft means,
   a chain wrapped over the sprocket,
   a guide sprocket above the shaft sprocket for leading the chain upwardly,
   and a counterweight attached to the free end of the chain and depending downwardly for counterbalancing the weight of the hand.

References Cited by the Examiner

UNITED STATES PATENTS

| | | |
|---|---|---|
| 1,941,347 | 12/1933 | Gum. |
| 2,012,414 | 8/1935 | Adams. |
| 2,274,020 | 2/1942 | Weightman et al. |
| 2,365,832 | 12/1944 | Monroe. |
| 2,753,903 | 7/1956 | Allison _____ 146—3 |

J. SPENCER OVERHOLSER, *Primary Examiner.*